Figure 1:
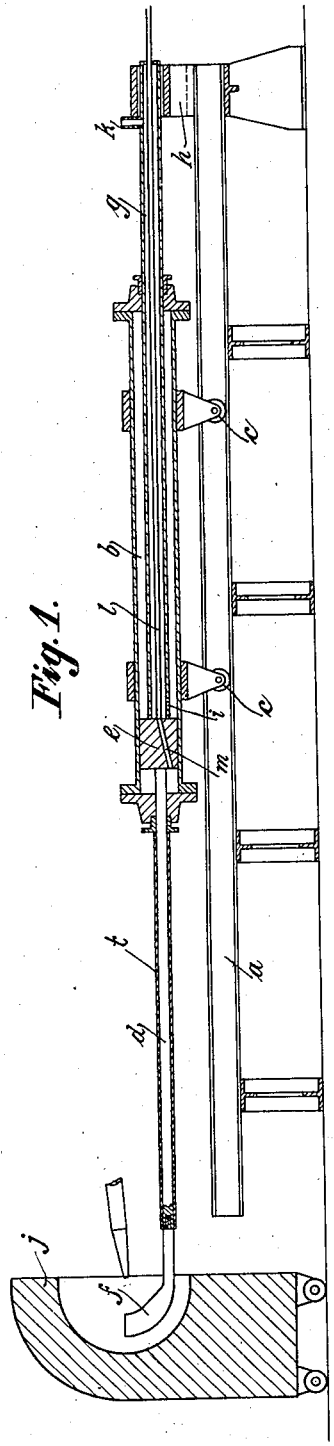

Nov. 8, 1927.

R. H. BÖHLING 1,648,161

MACHINE FOR PRODUCING TUBULAR BENDS AND COILS AND FOR EXPANDING TUBES

Filed Jan. 25, 1927

INVENTOR
R. H. Böhling
by
Langner, Parry,
Card & Langner
Att'ys.

Patented Nov. 8, 1927.

1,648,161

UNITED STATES PATENT OFFICE.

RUDOLF HIERONYMUS BÖHLING, OF HAMBURG-STEINWARDER, GERMANY, ASSIGNOR TO ROHRBOGENWERK GESELLSCHAFT MIT BESCHRÄNKTER HAFTUNG, OF HAMBURG, GERMANY, A FIRM.

MACHINE FOR PRODUCING TUBULAR BENDS AND COILS AND FOR EXPANDING TUBES.

Application filed January 25, 1927, Serial No. 163,509, and in Germany February 8, 1926.

For producing tubular bends, coils, and the like or for expanding tubes to a larger diameter hydraulic machines are used, in which the tubular work piece is slipped on a piston rod, which at its free end is given an increasing diameter or is connected with a similar mandrel which is drawn into the tubular work piece while supported at its other end against a firmly mounted cylinder. When the piston slidably guided within this cylinder and connected with said piston rod is compelled by any pressure medium to move longitudinally within the cylinder, the piston rod is pulled inwardly, thus forcing the expanded end of the piston rod or the mandrel into the tubular work piece and thereby expanding it, or eventually at the same time forming it into a bend corresponding to the shape of the mandrel. For reducing the power hereby necessary the end of the work piece which is slipped over the mandrel will be preferably heated which may be done by any heating means. A hood made of refractory material is arranged to embrace that portion of the tubular workpiece to be heated together with the heating means. In the plants used heretofore the said hood and the burners of the gas flame together with the gas feeding pipes must be movable so as to be enabled to approach the cylinder each time after a bend is produced and cut off from the work-piece. The tubular work-piece generally will have a length of several metres and therefore the hood and the heating means must have a movability for a corresponding length, and this fact makes it very inconvenient and inexpedient and an unsuitable construction of the hood results on account of the projecting machine frame.

By the present invention the aim is to avoid the moving about of the hood and the heating means to the extent as heretofore when progressively producing bends or the like one after the other with the result to enable the heating being effected always on the same spot for every bend produced from one single tubular work piece. According to the invention this result is secured by making the mandrel and the piston rod unmovable and arranging the cylinder to reciprocate, which is thus adapted to force the tubular work piece along the piston rod and over the mandrel. Even in this construction, it is true, the hood must be moved back to some extent to permit the produced bend to be severed from the work piece, that is to say to allow the bend for the sake of being cut, to be accessible outside the hood. However, this retraction of the hood is necessary only for a small and always the same degree and is neither inconvenient nor inexpedient, because there is no obstacle offered by the machine.

Moreover this retraction of the hood when severing the bend from the work piece may also be avoided according to the invention, so that the hood and the heating device may remain always on the same spot. This greatly simplifies working. With this object in view a retraction cylinder is immovably mounted, its piston being connected with the piston of the pushing cylinder by a common piston rod. By the aid of this retraction cylinder the piston is operated by a pressure medium so that it withdraws the mandrel from the hood to such an extent that the bend produced is conveniently accessible for being severed from the tubular work piece. By the movement of the piston of the retraction cylinder in opposite direction the mandrel will again be introduced into the hood. In reciprocating the retraction piston in both directions the pushing cylinder will participate in these movements.

Figure 2:
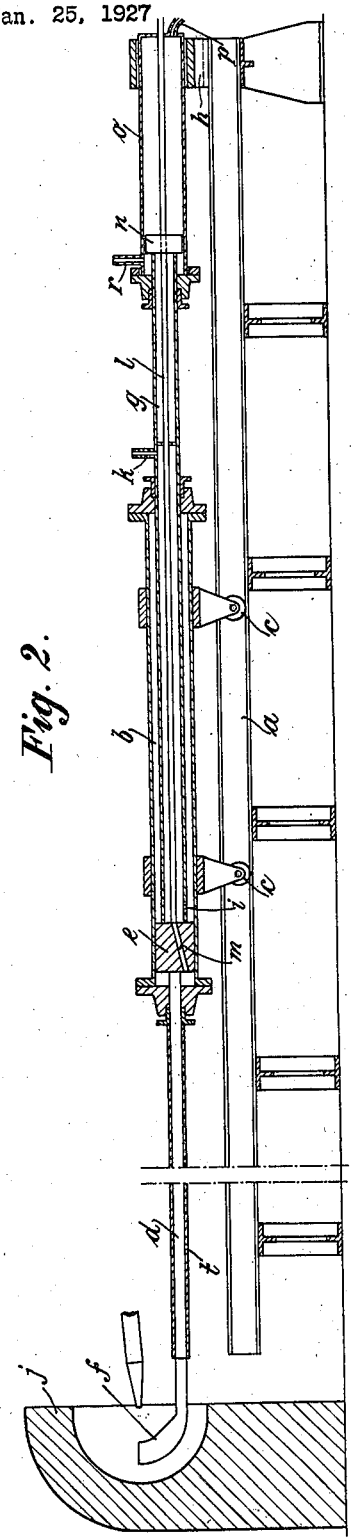

In the drawing Fig. 1 is a longitudinal section of the apparatus constructed according to the present invention, and Fig. 2 is a similar view of a modification.

For the pushing cylinder $b$ having a considerable length a track $a$ constitutes part of the machine frame and is adapted for horizontally guiding said cylinder, which by rollers $c$ is adapted to run on said track $a$ longitudinally. The piston rod $d$, which is firmly attached to the piston $e$ within the cylinder $b$, projects outwardly and at its free end is screwed to the mandrel $f$. From the right-hand end, Fig. 1, of the cylinder $b$ projects a pipe $g$ which is attached to the piston $e$, and at its utmost end is immovably supported by a bracket $h$ on the machine frame, at which end the pipe is closed. It will be seen that by this construction the piston $e$ and the mandrel $f$ are unmovable. The pipe $g$ is provided with an opening $i$ close to the piston $e$ and at the other end the pipe $g$ has a branch pipe $k$ by which a pressure medium (for instance compressed water) may be introduced. Within the cylinder $g$ a second thinner pipe $l$ is attached to the piston $e$ and projects out through the closed end of the pipe $g$, where this pipe is resting in the bracket $h$. At the point, where the pipe $l$ is attached to the piston $e$, it communicates with a passage $m$ leading into the space in front of the piston $e$. By the means described above the compressed water may be allowed to enter the cylinder either on the left-hand side of the piston $e$ or on the right-hand side of the piston to either push out the movable cylinder or to retract it.

The tubular work piece being slipped on the piston rod $d$ will be pushed towards the left, when the cylinder $b$ is moved in this direction by compressed water entering the cylinder on the left-hand side by the pipe $l$. The pipe thus being forced forwardly will be urged over the mandrel $f$ thus being turned into a bend at this end. When it is necessary to sever the newly formed bend from the tubular work piece the hood $j$ is retracted outwardly. After taking off the bend the hood is moved into its normal position again, and then the forward movement of the cylinder is continued to again force the forward end of the tubular work piece over the mandrel.

In the drawing machine shown in Fig. 2 the tube $g$ is not attached to the bracket $h$ but at its free end is provided with a second piston $n$, which is adapted to reciprocate within a retraction cylinder $o$ firmly mounted on the bracket $h$. The narrow pipe $l$ within the pipe $g$ passes out through the end of the retraction cylinder $o$. The cylinder $o$ at its utmost end is connected with the pipe $p$ for feeding compressed water. A further branch pipe $r$ on the other end of the cylinder $o$ is also provided for feeding compressed water.

The firm hold of the piston rod $d$ or the mandrel $f$ is effected in the machine shown in Fig. 1 by the bracket $h$, and by compressed water within the retraction cylinder $o$ of the right-hand side of the piston $n$ in the construction shown in Fig. 2. The stroke of the piston $n$ within the retraction cylinder $o$ is so dimensioned that the piston on its movement towards the left-hand end of the retraction cylinder draws the mandrel $f$ sufficiently backwardly from the heating hood $j$.

When on account of the forward movement of the cylinder $b$ a bend is produced, compressed water is introduced into the retraction cylinder $o$ on the left-hand side of the piston $n$, while on the right-hand side compressed water is allowed to escape, thus forcing the piston $n$ and also the mandrel $f$ towards the right, that is to say, withdrawing it from the hood. The cylinder $b$ participates in this movement so that the piston $e$ remains in its position. When the bend thus produced is severed from this tubular work piece compressed water is allowed to enter the retraction cylinder on the right-hand side of the piston $n$, while the compressed water on the other side of the piston $n$ is allowed to escape. Thus the piston $n$ and the mandrel $f$ are moved towards the left, the latter entering again the hood, the cylinder $b$ also being moved into its former position, which it had when the bend was produced.

The pipe $l$ may open out into the space of the right-hand side of the retraction cylinder, so that the introduction of compressed water into the cylinder $e$ on the left-hand side may be effected by compressed water being forced into the pipe $p$ passing over the right-hand side of the retraction cylinder.

I claim:—

1. A machine for producing tubular bends, coils and the like or for expanding tubes, comprising a cylinder, a piston fitting within said cylinder, a piston rod projecting out through the end wall of the cylinder and adapted to carry and guide the tubular work piece, a mandrel at the free end of said piston rod, the said cylinder adapted to reciprocate and the said piston being adapted to be firmly held while the cylinder is operating to push the tubular work piece along said piston rod, and means to introduce a compressed medium into the cylinder in front of or behind the said piston.

2. A machine according to claim 1, comprising a second cylinder immovably mounted, a piston slidable within said second cylinder and connected with the piston of the first-named cylinder, and means to feed a compressed medium in front of or behind the piston of the said second cylinder.

3. A machine according to claim 1, comprising a second cylinder immovably mounted, a piston slidable within said second cylinder and connected with the piston of the first-named cylinder, means to feed a compressed medium in front of or behind the piston of the said second cylinder, a tubular piston rod connecting the two pistons and adapted to feed the compressed medium into the first-named cylinder behind its piston, a tube connected with the piston of the first-named cylinder of a smaller diameter than the said tubular piston and passing therethrough and also through the piston of the second-named cylinder and a passage within the first-named piston to connect the last-named tube with the space of the first-named cylinder in front of its piston.

In testimony whereof I have signed my name to this specification.

RUDOLF HIERONYMUS BÖHLING.